V. A. QUAGLIANO.
INDICIA PLATE FOR LENSES.
APPLICATION FILED FEB. 20, 1922.
1,426,770.
Patented Aug. 22, 1922.
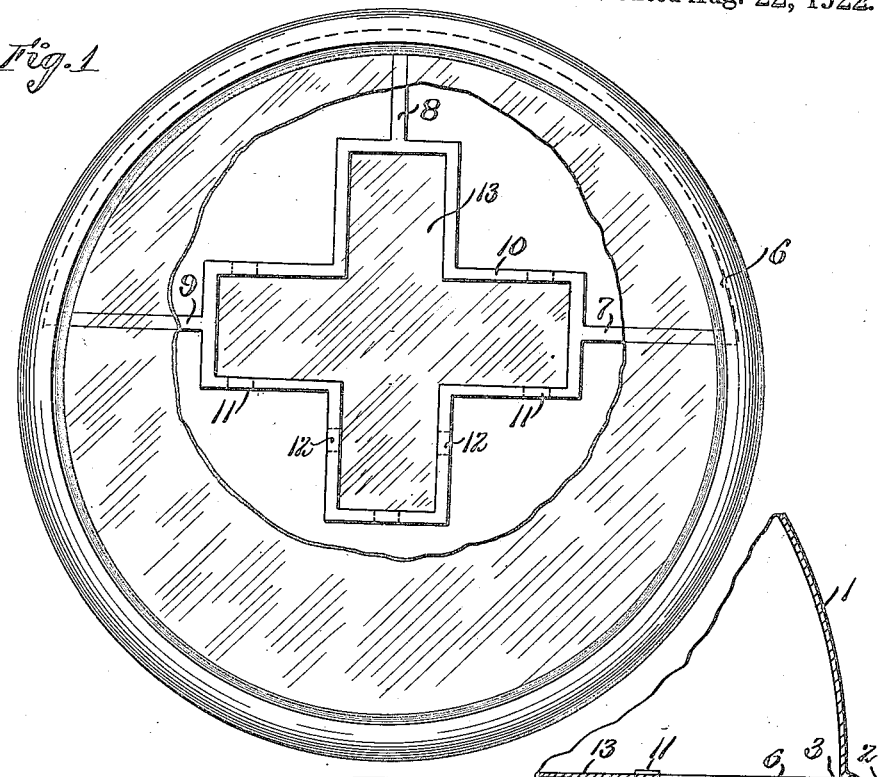
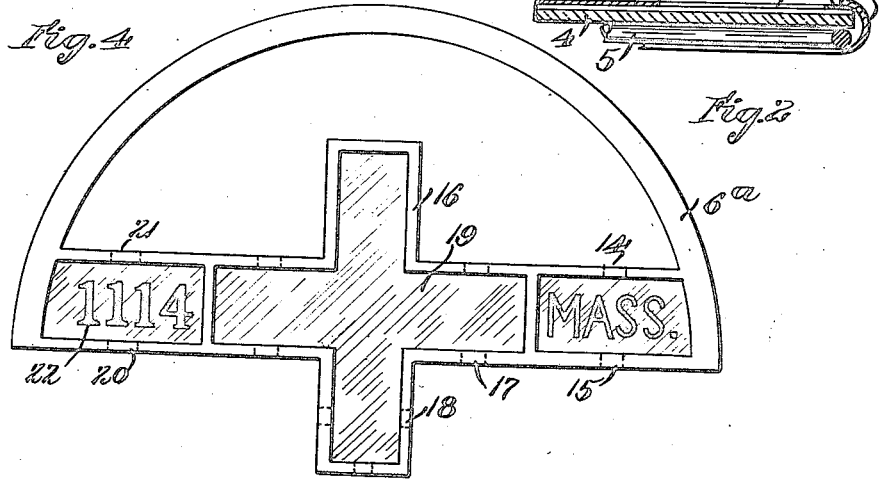
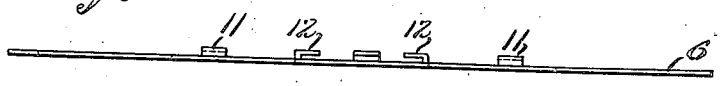
Inventor:
Tito A. Quagliano,
by Roberts, Roberts & Cushman
his attys.

UNITED STATES PATENT OFFICE.

VITO A. QUAGLIANO, OF EAST BOSTON, MASSACHUSETTS.

INDICIA PLATE FOR LENSES.

1,426,770. Specification of Letters Patent. Patented Aug. 22, 1922.

Application filed February 20, 1922. Serial No. 537,764.

*To all whom it may concern:*

Be it known that I, VITO A. QUAGLIANO, a citizen of the United States of America, and resident of East Boston, in the county of Suffolk and State of Massachusetts, have invented new and useful Improvements in Indicia Plates for Lenses, of which the following is a specification.

This invention concerns vehicle headlights, and relates more particularly to means whereby the headlight lens of an automobile may be provided with suitable indicia, to indicate, for example, the profession of the owner of such vehicle, to show the license number, or to convey other desired information.

It has heretofore been proposed, as disclosed in my Patent No. 1,388,891, August 30, 1921, and my Design Patent No. 60,106, December 27, 1921, to provide a lens having thereon suitable distinguishing indicia, such for example as a red or green cross or the like, forming an integral element of the lens, such lenses being particularly intended for use upon ambulances or physicians' automobiles whereby the character of the vehicle or the profession of its occupant may readily be apparent both by day and by night. While lenses constructed in accordance with the disclosures of the above patents are very desirable and fill a long felt want, their use necessitates the discarding of the old lens in favor of the improved lens, while the improved lenses are necessarily somewhat expensive by reason of the special processes of manufacture required for providing the integral, colored figures thereon.

The present invention has for its principal object the provision of means readily applicable to existing lenses whereby many of the advantages of the patented lens may be obtained, and of a character such as to permit of its production at a relatively low cost and its installation in the headlight by unskilled workmen and without the use of special tools.

In the accompanying drawings, there is shown by way of example, one specific arrangement of parts whereby the above object may be attained, and in such drawings, Figure 1 is a front elevation of an automobile headlight showing the lens as partly broken away to expose the device of the present invention as installed within the headlight casing;

Figure 2 is a fragmentary cross section through the headlight lens and casing showing the device of the present invention as applied thereto;

Figure 3 is an edge view of the device of the present invention; and

Figure 4 is a front elevation of a modified form of device.

Referring to Figs. 1 and 2, the headlight casing is indicated at 1, such casing being provided with the usual roll flange 2 at its edge, and with a packing ring 3 whereby the lens 4 is positioned. A retaining ring 5 of usual construction is shown at the front side of the lens for securing the latter in place.

In accordance with the present invention the indicia plate is formed of sheet material and comprises a substantially semi-circular rim 6 having the inwardly directed arms or bars 7, 8, 9. These arms serve to support an open frame 10, which as illustrated in Fig. 1 is of cruciform outline, although it is contemplated that frames of other shape might well be substituted therefor as occasion might demand. This frame is preferably provided with integral tabs or clips 11, 12, or equivalent means, which serve to position a plate 13 of celluloid, glass or other suitable material within the open frame. This plate may be of some distinctive color as for example, red or green, so that the light in passing therethrough will clearly define the form of the plate as visible through the opening in the frame. While as herein shown the tabs 11 are integral with the frame, it is contemplated that other securing means may well be substituted therefor. It is also clearly possible to secure the frame 10 to the plate 6 by means of arms or supports arranged differently from those shown in Fig. 1, and as may be found best from practical considerations.

In Fig. 4 there is illustrated a modification of the device of Fig. 1 wherein the semi-circular plate 6ª is provided with transversely extending arms or bars 14, 15 suitably spaced apart and serving to support the cruciform frame 17 at the center of the semi-circular plate. This frame is provided with tabs 17, 18 for holding a plate or film 19 of distinctive color or appearance. The bars 14, 15 may also be provided with tabs such as 20, 21, for holding additional plates such as 22 upon which may be placed the license number or other desirable indicia.

Either of the arrangements above described may be readily formed from sheet material and at a relatively low cost so that the device may be applied to existing headlight lenses without change in the latter and without the necessity of employing the services of a skilled mechanic or the use of special tools. The device thus formed is simple and substantial and does not interfere to a material degree with the emission of light through the lens of the headlight.

While as herein illustrated the device is arranged on the inside of a headlight, it is clear that it might well be placed upon the outer side of the lens if desired, and while a cross shaped figure has been shown as constituting the distinctive element of the colored design provided by the device, it is to be understood that the open frame within which the celluloid or glass is supported may be of any desired outline whereby to provide the proper indicia upon the face of the lens.

I claim:

1. An indicia plate for lenses comprising a circumferentially extending substantially semi-circular rim of sheet material, inwardly directed supporting means integral therewith, and a suitably configurated open frame integral with said supporting means and supported by the latter and constructed and arranged to engage the surface of a lens.

2. An indicia plate for lenses comprising a curved rim of substantially semi-circular extent, an integral arm extending radially inwardly therefrom, an open frame of cruciform outline integrally secured to said arm, and means for retaining a piece of sheet material within said frame.

3. An indicia plate for lenses comprising a curved rim, a plurality of inwardly directed arms extending therefrom, an open frame of cruciform outline mounted upon the adjacent ends of said arms, a sheet of light transmitting material within said frame, and integral tabs projecting from said frame for holding such sheet of material in place.

4. An indicia plate for lenses comprising a circumferentially curved rim, a pair of parallelly disposed arms extending inwardly from said rim, an open frame supported by said arms, and means for securing indicia elements within said frame and between said arms.

Signed by me at Boston, Massachusetts, this 9th day of February, 1922.

VITO A. QUAGLIANO.